(12) United States Patent
LaVoie et al.

(10) Patent No.: US 9,401,943 B2
(45) Date of Patent: Jul. 26, 2016

(54) REAL-TIME CUSTOMIZABLE MEDIA CONTENT FILTER

(71) Applicant: International Business Machines Corporation, Armonk, NY (US)

(72) Inventors: Jason D. LaVoie, Littleton, MA (US); Javed Rahman, Medford, MA (US); Eric S. Steitz, Woburn, MA (US)

(73) Assignee: International Business Machines Corporation, Armonk, NY (US)

(*) Notice: Subject to any disclaimer, the term of this patent is extended or adjusted under 35 U.S.C. 154(b) by 334 days.

(21) Appl. No.: 13/746,295

(22) Filed: Jan. 21, 2013

(65) Prior Publication Data

US 2014/0207450 A1 Jul. 24, 2014

(51) Int. Cl.

| | |
|---|---|
| *G06F 17/27* | (2006.01) |
| *G06F 7/04* | (2006.01) |
| *G06F 17/21* | (2006.01) |
| *H04N 21/454* | (2011.01) |
| *H04N 7/16* | (2011.01) |
| *H04L 29/06* | (2006.01) |
| *H04N 21/233* | (2011.01) |
| *H04N 21/4545* | (2011.01) |
| *H04N 21/475* | (2011.01) |
| *H04N 21/488* | (2011.01) |
| *H04N 21/845* | (2011.01) |

(52) U.S. Cl.
CPC .............. *H04L 65/60* (2013.01); *H04N 21/233* (2013.01); *H04N 21/4542* (2013.01); *H04N 21/45457* (2013.01); *H04N 21/4751* (2013.01); *H04N 21/4884* (2013.01); *H04N 21/8456* (2013.01)

(58) Field of Classification Search
CPC ...... H04L 29/06; H04L 65/60; H04N 21/233; H04N 21/4542; H04N 21/454; H04N 7/166; G06F 17/27; G06F 7/04; G06F 17/21

USPC .............. 704/9, 235, 500; 709/231; 707/706; 725/28

See application file for complete search history.

(56) References Cited

U.S. PATENT DOCUMENTS

| | | | |
|---|---|---|---|
| 5,195,135 A | 3/1993 | Palmer | |
| 5,757,417 A | 5/1998 | Aras et al. | |
| 5,818,510 A | 10/1998 | Cobbley et al. | |
| 5,978,920 A | 11/1999 | Lee | |
| 6,075,550 A | 6/2000 | Lapierre | |
| 6,519,770 B2 | 2/2003 | Ford | |
| 7,865,370 B2* | 1/2011 | Cormack | H04H 60/37 704/251 |
| 7,983,902 B2* | 7/2011 | Wu | G06F 17/2745 704/1 |
| 7,991,724 B2* | 8/2011 | Antebi | G06N 5/022 704/9 |
| 8,079,044 B1* | 12/2011 | Craner | H04N 21/4532 725/28 |
| 8,229,742 B2* | 7/2012 | Zimmerman | G06F 19/322 380/277 |
| 8,612,211 B1* | 12/2013 | Shires | G06F 17/27 704/10 |
| 2002/0122137 A1 | 9/2002 | Chen et al. | |
| 2002/0147782 A1* | 10/2002 | Dimitrova | H04N 7/163 709/207 |

(Continued)

*Primary Examiner* — Pierre-Louis Desir
*Assistant Examiner* — Seong Ah A Shin
(74) *Attorney, Agent, or Firm* — VanLeeuwen & VanLeeuwen; Thomas E. Tyson

(57) ABSTRACT

According to one embodiment of the present disclosure, an approach is provided in which a processor receives a media stream that includes media content. The processor selects a media stream segment included in the media stream, and generates annotated data based upon a portion of the media content included in the selected media stream segment. The processor, in turn, compares the annotated data with obfuscation preferences that correspond to prohibited content, and modifies the media stream segment in response to the comparison.

11 Claims, 8 Drawing Sheets

(56) References Cited

U.S. PATENT DOCUMENTS

| | | | |
|---|---|---|---|
| 2004/0010798 A1* | 1/2004 | Galli | H04H 60/31 725/28 |
| 2007/0204288 A1* | 8/2007 | Candelore | H04N 5/4401 725/28 |
| 2008/0263159 A1* | 10/2008 | Choi | H04L 12/585 709/206 |
| 2009/0083326 A1 | 3/2009 | Pelton | |
| 2009/0133089 A1 | 5/2009 | Ku et al. | |
| 2010/0138517 A1 | 6/2010 | De Los Reyes et al. | |
| 2012/0151217 A1 | 6/2012 | Porter et al. | |
| 2012/0159530 A1 | 6/2012 | Ahrens et al. | |
| 2013/0111005 A1* | 5/2013 | Chu | G06N 7/005 709/224 |
| 2013/0166721 A1* | 6/2013 | Soffer | H04L 51/32 709/224 |
| 2013/0174058 A1* | 7/2013 | Kaul | G06F 3/0481 715/753 |
| 2013/0347027 A1* | 12/2013 | Kano | H04N 21/4542 725/28 |
| 2014/0244611 A1* | 8/2014 | Krishnapuram | G06F 17/3064 707/706 |

* cited by examiner

REAL-TIME CUSTOMIZABLE MEDIA CONTENT FILTER

BACKGROUND

The present disclosure relates to a real-time customizable media content filter that selectively obfuscates audio and/or video content according to user preferences.

Media content is available to a user from a wide variety of sources. Using today's mobile technologies, a user may view movies, television shows, home-made videos, etc., anywhere a satellite signal, broadcast signal, or Internet connection is available. Content producers typically rate movies and shows according to a particular standard in order to assist a user in determining age-appropriate content in which to view. The Motion Picture Association of America (MPAA) developed a rating system for motion pictures which provides parental guidance as well as viewing audience regulation (G, PG, PG-13, etc.). The Federal Communications Commission (FCC) has also developed a similar rating system for television programs, such as TV-Y, TV-MA, etc. These ratings pertain to a movie or television show as a whole and are typically based on public-sediment.

BRIEF SUMMARY

According to one embodiment of the present disclosure, an approach is provided in which a processor receives a media stream that includes media content. The processor selects a media stream segment included in the media stream, and generates annotated data based upon a portion of the media content included in the selected media stream segment. The processor, in turn, compares the annotated data with obfuscation preferences that correspond to prohibited content, and modifies the media stream segment in response to the comparison.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
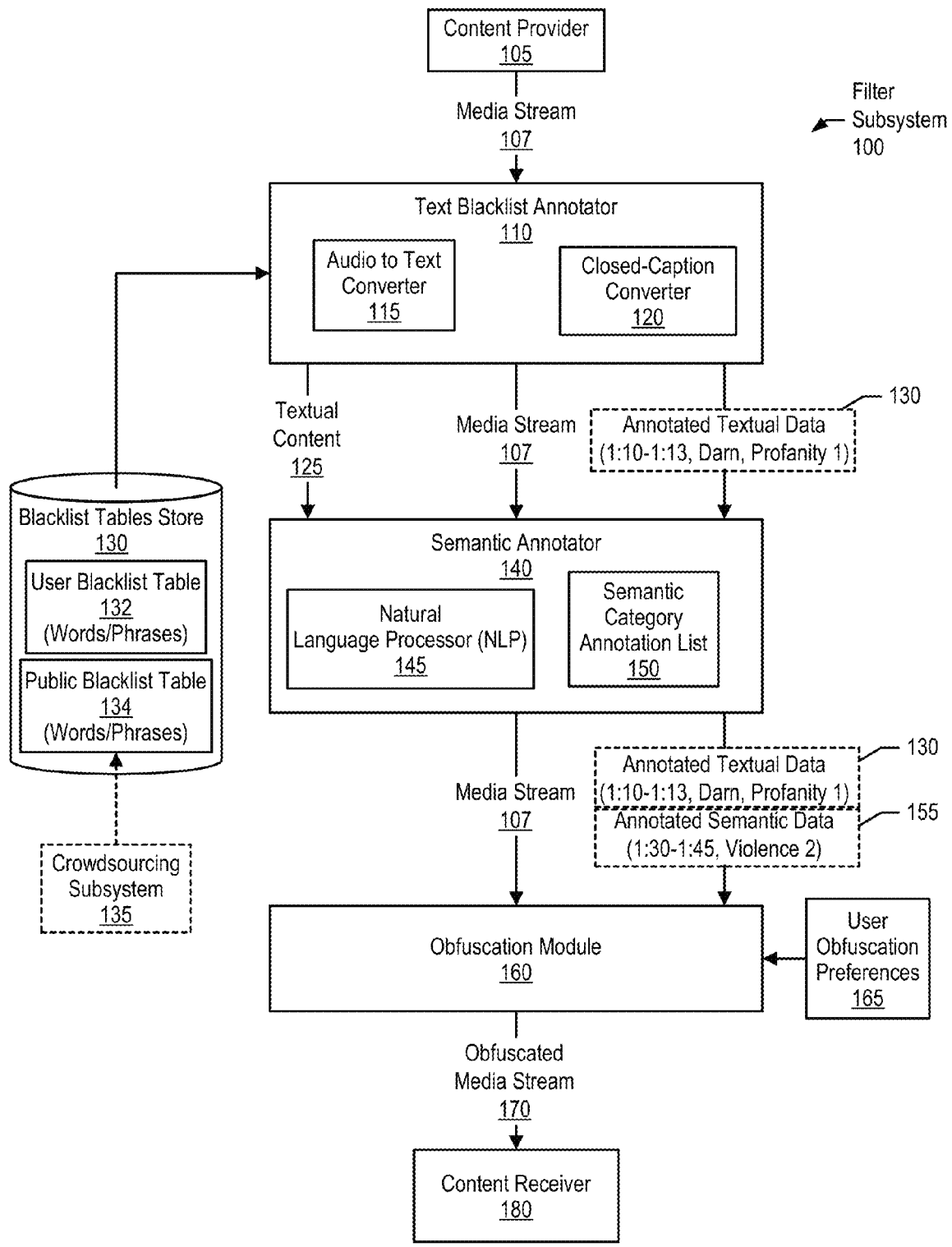
FIG. 1 is a diagram showing a filter subsystem obfuscating a media stream based upon comparing textual content annotation and semantic annotation to user preferences.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing a filter subsystem obfuscating a media stream based upon comparing textual content annotation and semantic annotation to user preferences. Filter subsystem 100 obfuscates segments of a media stream (e.g., audio segments, video segments, and/or closed captioning segments) based upon user preferences. In one embodiment, filter subsystem 100 obfuscates media stream segments according to annotated semantic data (annotated semantic data 155) generated from natural language processor 145. In another embodiment filter subsystem 100 obfuscates media stream segments based upon "blacklisted" words and/or phrases (annotated textual data 130).

Content provider 105 provides media stream 107. As discussed herein, content provider 105 may be any provider of media content, such as a television station, cable station, satellite station, radio station, Internet data, DVD player, flash drive, hard drive, etc. (see FIG. 2 and corresponding text for further details). Also discussed herein, media stream 107 may include multiple media streams, such as a video stream, an audio stream, and/or a closed captioning stream.

Media stream 107 feeds into text blacklist annotator 110, which may be implemented in software, hardware, or a combination of hardware and software. Text blacklist annotator 110 converts media stream 107's audio information to textual content via audio to text converter 115, and converts media stream 107's closed captioning information (if applicable) to textual content via closed-caption converter 120.

In turn, text blacklist annotator 110 analyzes textual content 125 ((includes converted audio and/or converted closed-captioning information) against blacklist tables 132 and/or 134 included in blacklist table store 130. Blacklist tables store 130 includes tables that include "blacklisted" words and/or phrases, such as inappropriate words and/or phrases viewed by the public as inappropriate or offensive. In one embodiment, blacklist table store 130 includes a customized blacklist table created by a user (user blacklist table 132) and also includes public blacklist table 134 that is managed by crowdsourcing subsystem 135 (See FIG. 3 and corresponding text for further details).

Figure 6:
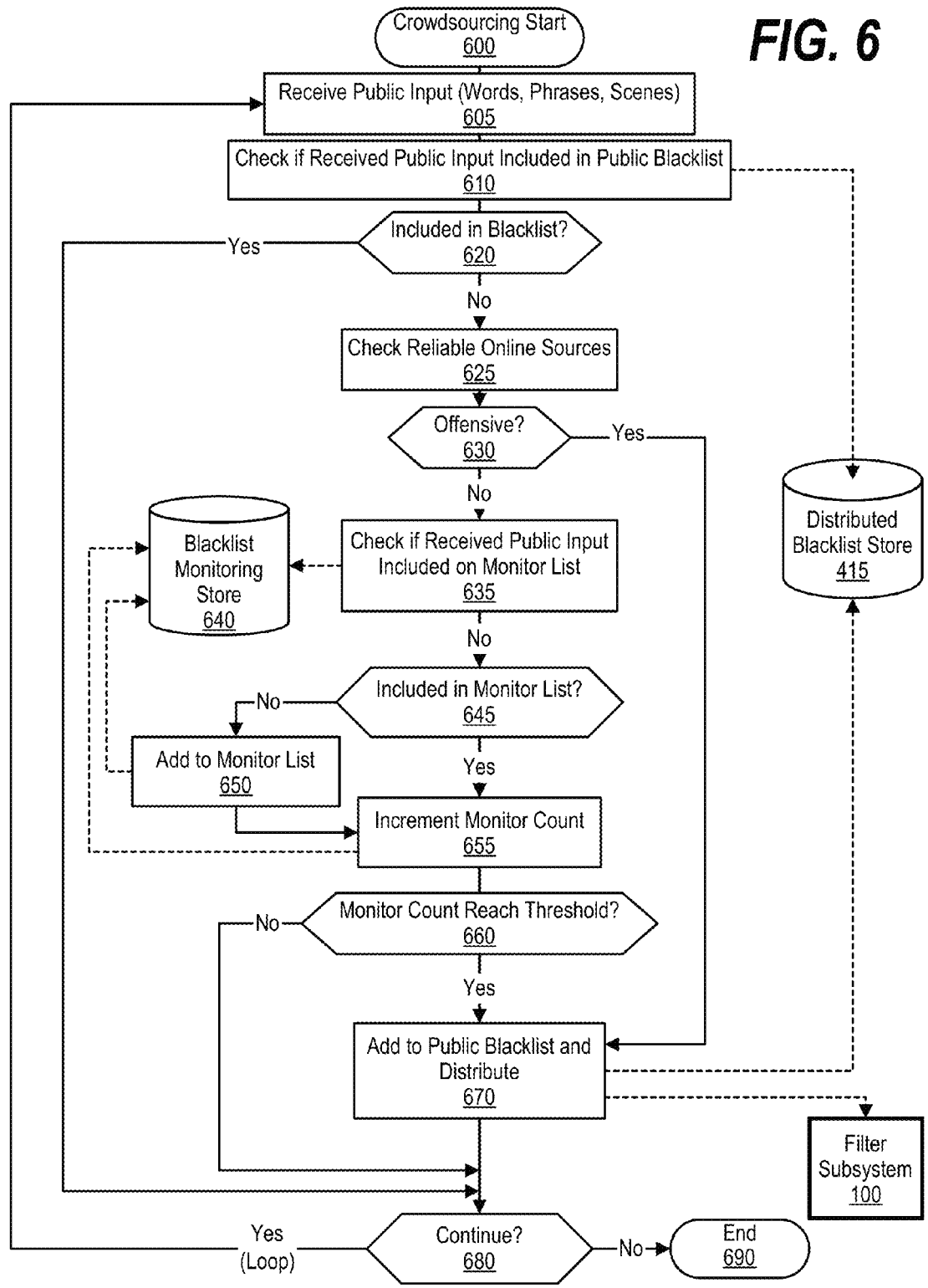
FIG. 6 is a flowchart showing steps taken in a crowdsourcing module updating public blacklist information according to public opinion.

Crowdsourcing system 135, in one embodiment, may be a remote system that receives public input content and evaluates whether words/phrases are accepted by the general public as inappropriate or offensive (see FIG. 6 and corresponding text for further details). In one embodiment, tables 132 and/or 134 may comprise table entries that include a blacklisted word/phrase, a textual category corresponding to the blacklisted word/phrase (profanity, violence, etc.), and a category level corresponding to the textual category based upon the inappropriateness and/or offensiveness of the blacklisted word/phrase (level 1, 2, 3, etc.).

When text blacklist annotator 110 identifies a match between textual content 125 and one of the blacklist table entries, text blacklist annotator 110 creates annotated textual data 130 on an annotated data stream that feeds into semantic annotator 140. Annotated textual data 130 includes a timestamp of the matched textual content (1:10-1:13), the matched word (darn), and the textual category and level (e.g., profanity 1, see FIG. 3 and corresponding text for further details).

In addition to evaluating textual content 125, text blacklist annotator 110 provides textual content 125 (includes converted audio and/or converted closed-captioning information) to semantic annotator 140. Semantic annotator 140 includes natural language processor (NLP) 145 and semantic category annotation list 150. NLP 145 analyzes textual content 125 and generates annotated semantic data 155, which "describes" the media content of media stream 107. For example, media stream 107 may include a gunfight scene and, in turn, NLP 145 evaluates the textual content and uses semantic category annotation list 150 to determine that the media content corresponds to violence at level 2. In turn, semantic annotator 140 generates annotated semantic data 155 that includes a timestamp, semantic category, and semantic category level. Annotated semantic data 155 is added to the annotated data stream, which is fed along with annotated textual data 130 into obfuscation module 160.

Obfuscation module 160 receives media stream 107 and the annotated data (130 and 155) and compares the annotated data with user obfuscation preferences 165 corresponding to prohibited content. For example, a user may specify a "Family" setting that instructs obfuscation module to obfuscate media segments that include violence higher than level 2 and profanity higher than level 1. Obfuscation module 160 matches the annotated data with the user obfuscation preferences and obfuscates media stream 107 at media segments matching timestamps included in the annotated data, thus creating obfuscated media stream 170 (see FIG. 5 and corresponding text for further details).

Obfuscation media stream 170 feeds into content receiver 180 (e.g., television, radio, cell phone, etc.), which presents the obfuscated media stream to a user, such as playing the audio portion through speakers and/or displaying the video/closed captioning portion on a display.

Figure 2:
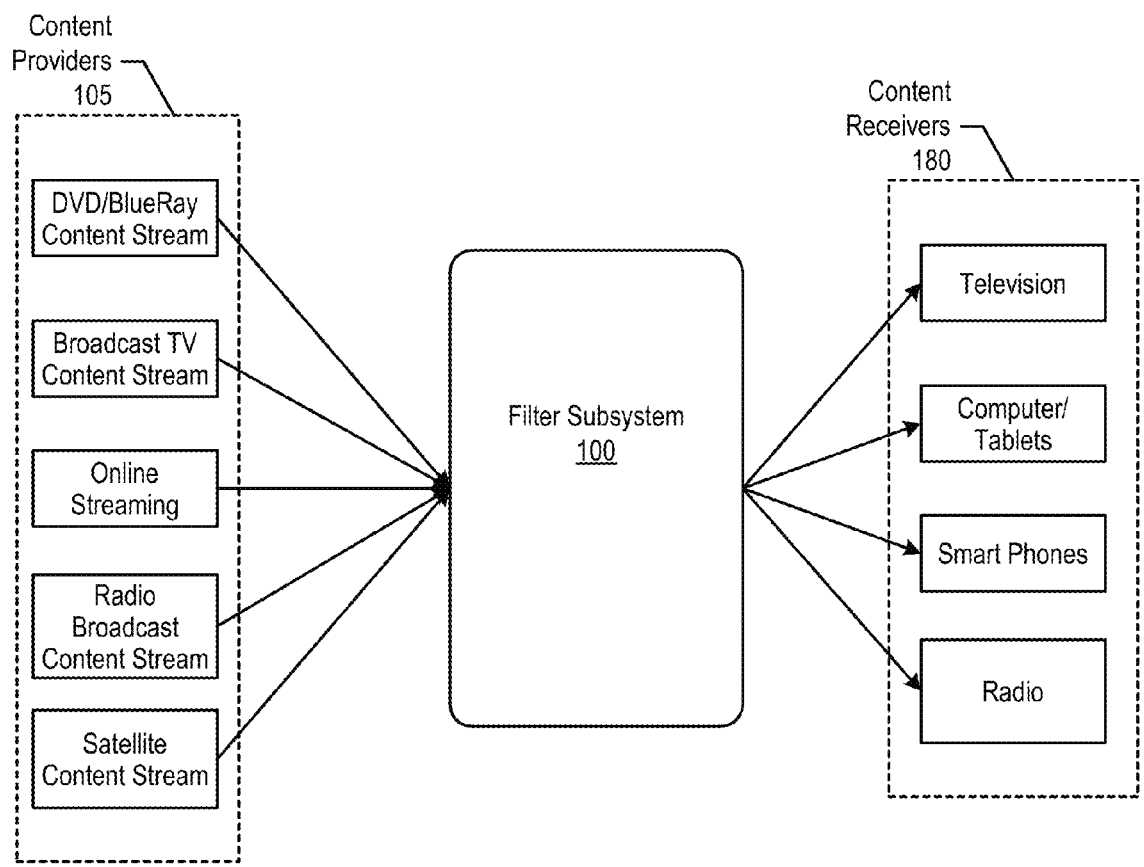
FIG. 2 is a diagram showing a filter subsystem receiving media streams from various types of content providers and providing filtered media content to various content receivers.

FIG. 2 is a diagram showing a filter subsystem receiving media streams from various types of content providers and providing filtered media content to various content receivers. As described herein, content providers 200 may be any form of media generating mechanism, such as DVD/Blueray players, broadcast TV content streams, online content streaming, radio broadcast streaming, satellite content streaming, etc.

Filter subsystem 100 receives media streams from content providers 200 and obfuscates media segments as configured. In turn, filter subsystem 100 provides obfuscated media stream 170 to media devices 220. Media devices 220, in one embodiment, include electronic devices such as a television, computer, tablet, smart phone, radio, etc.

In one embodiment, filter subsystem 100 is co-located with content receiver 180, such as in a set-top box or digital receiver. In another embodiment, filter subsystem 100 is co-located with content provider 105, such as at a server that is globally managed by a user.

Figure 3:
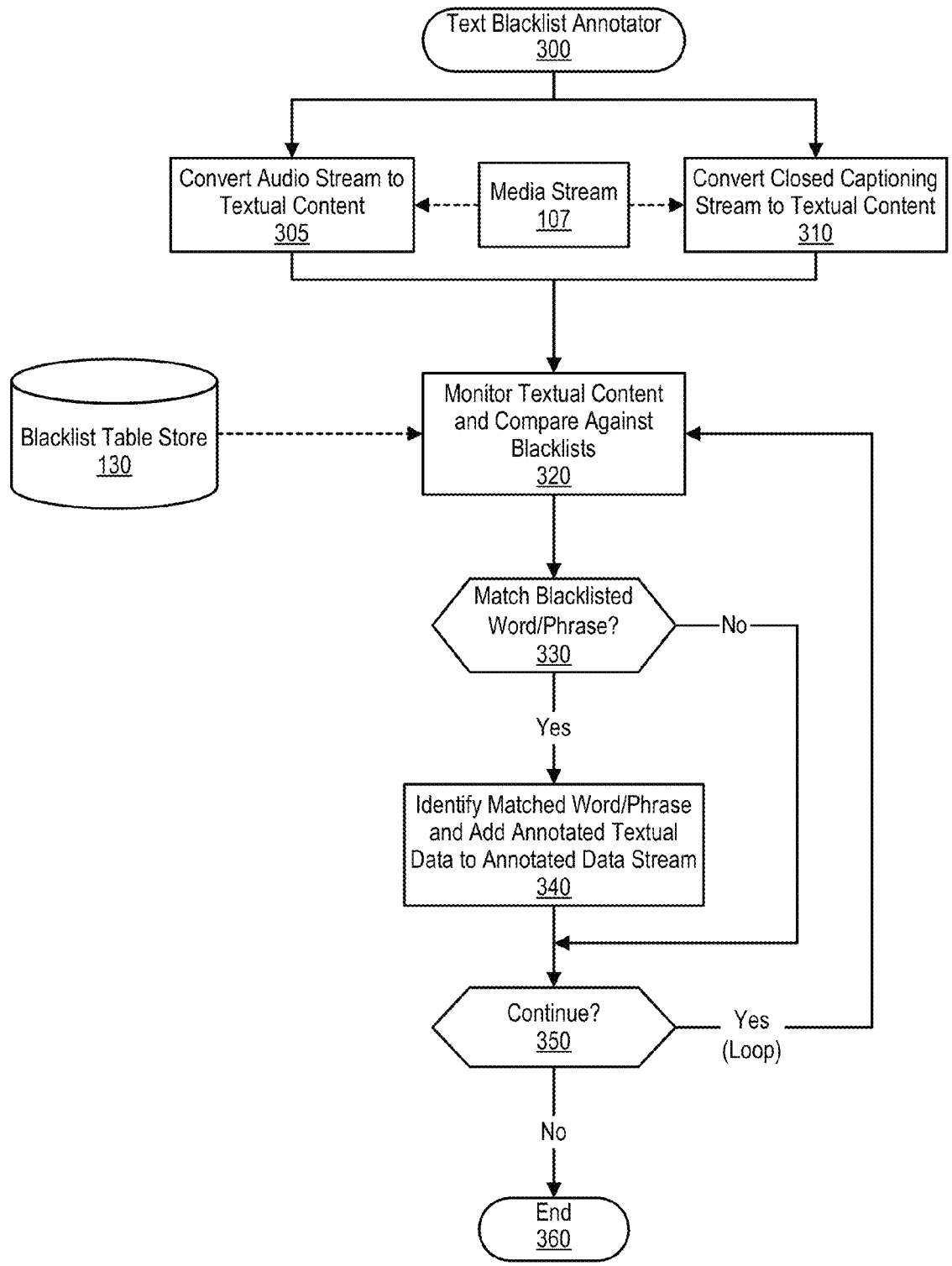
FIG. 3 is a flowchart showing steps taken in a text blacklist annotator comparing textual content with blacklist tables and generating annotated textual data accordingly.

FIG. 3 is a flowchart showing steps taken in a text blacklist annotator comparing textual content with blacklist tables and generating annotated textual data accordingly. Text blacklist processing commences at 300, whereupon the text blacklist annotator receives media stream 107 and converts the audio portion of the media stream to textual content using audio to text converter 115 (step 305). In addition, the text blacklist annotator converts a closed caption stream (e.g., embedded in a video stream) to closed captioning text using closed captioning converter 120 (step 310). Text blacklist annotator combines the textual content from step 305 and the closed captioning text from step 310 into textual content 125 shown in FIG. 1.

The text blacklist annotator compares words/phrases included in the textual content against blacklist tables included in blacklist table store 130 (step 320). In one embodiment, blacklist table store 130 includes a user blacklist table and a public blacklist table. In another embodiment, the blacklist tables are organized into levels such that a user may obfuscate blacklisted words/phrases based upon particular levels (see FIG. 5 and corresponding text for further details).

The textual blacklist annotator determines whether a word/phrase included in the textual content matches one of the words/phrases included in the blacklist tables (decision 330). When a match occurs, decision 330 branches to the "Yes" branch, whereupon the text blacklist annotator adds annotated textual data to an annotated data stream that includes, in one embodiment, a timestamp (location in the media stream) of the matched blacklisted word/phrase, the blacklisted word/phrase, and the blacklist category/level (e.g., profanity 2) of the matched blacklisted word/phrase (see annotated textual data 130 shown in FIG. 1). When the text blacklist annotator does not identify a match, decision 330 branches to the "No" branch, bypassing step 340.

A determination is made as to whether the text blacklist annotator should continue to monitor the media stream and generate textual content 125 (decision 350). If the text blacklist annotator should continue to monitor the media stream, decision 350 branches to the "Yes" branch, which loops back to generate annotated textual data accordingly. This looping continues until the text blacklist annotator should terminate (e.g., power turned off), at which point decision 350 branches to the "No" branch, whereupon text blacklist annotator processing ends at 360.

Figure 4:
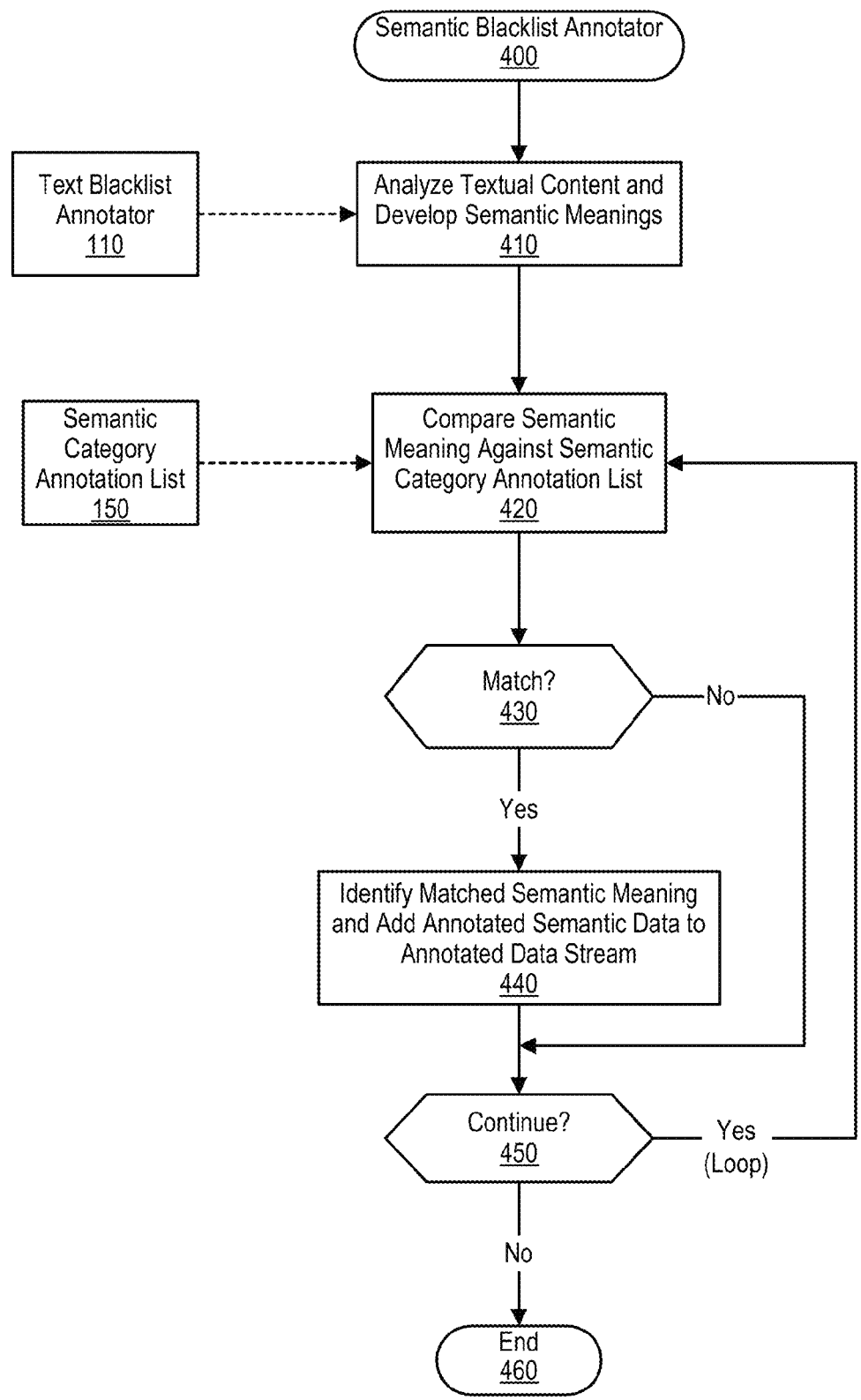
FIG. 4 is a flowchart showing steps taken in a semantic annotator generating annotated sematic data.

FIG. 4 is a flowchart showing steps taken in a semantic annotator generating annotated sematic data. Semantic annotator processing commences at 400, whereupon the semantic annotator analyzes textual content received from text blacklist annotator 110 at step 410. During the analysis, the semantic annotator constructs a semantic meaning of words/phrases included in the textual content.

At step 420, the semantic annotator compares the constructed semantic meaning against semantic category annotation list 150. Semantic category annotation list 150 includes, in one embodiment, generic categories such as horror, profanity, romantic, violence, etc. In another embodiment, the semantic annotator identifies semantic categories according to levels, such as violence 1 for old Western movie scenes and violence 3 for newer and more graphic scenes.

A determination is made as to whether the semantic annotator matched the constructed semantic meaning to a semantic category in semantic category annotation list 150 (decision 430). If a match occurred, decision 430 branches to the "Yes"

branch, whereupon the semantic annotator adds annotated semantic data to the annotated data stream that includes the semantic category and a timestamp corresponding to the matched content (e.g., violence from 1:30-1:50). On the other hand, if the semantic annotator does not match the constructed semantic meaning with one of the semantic categories, decision 430 branches to the "No" branch, bypassing semantic data annotation steps. For example, the semantic annotator may develop a semantic meaning of "sleeping", which is not considered as a category worth obfuscating.

A determination is made as to whether the semantic annotator should continue to monitor the textual content (decision 450). If the text semantic annotator should continue to monitor the textual content, decision 450 branches to the "Yes" branch, which loops back to generate annotated semantic data accordingly. This looping continues until the semantic annotator should terminate (e.g., power turned off), at which point decision 450 branches to the "No" branch, whereupon semantic annotator processing ends at 460.

Figure 5:
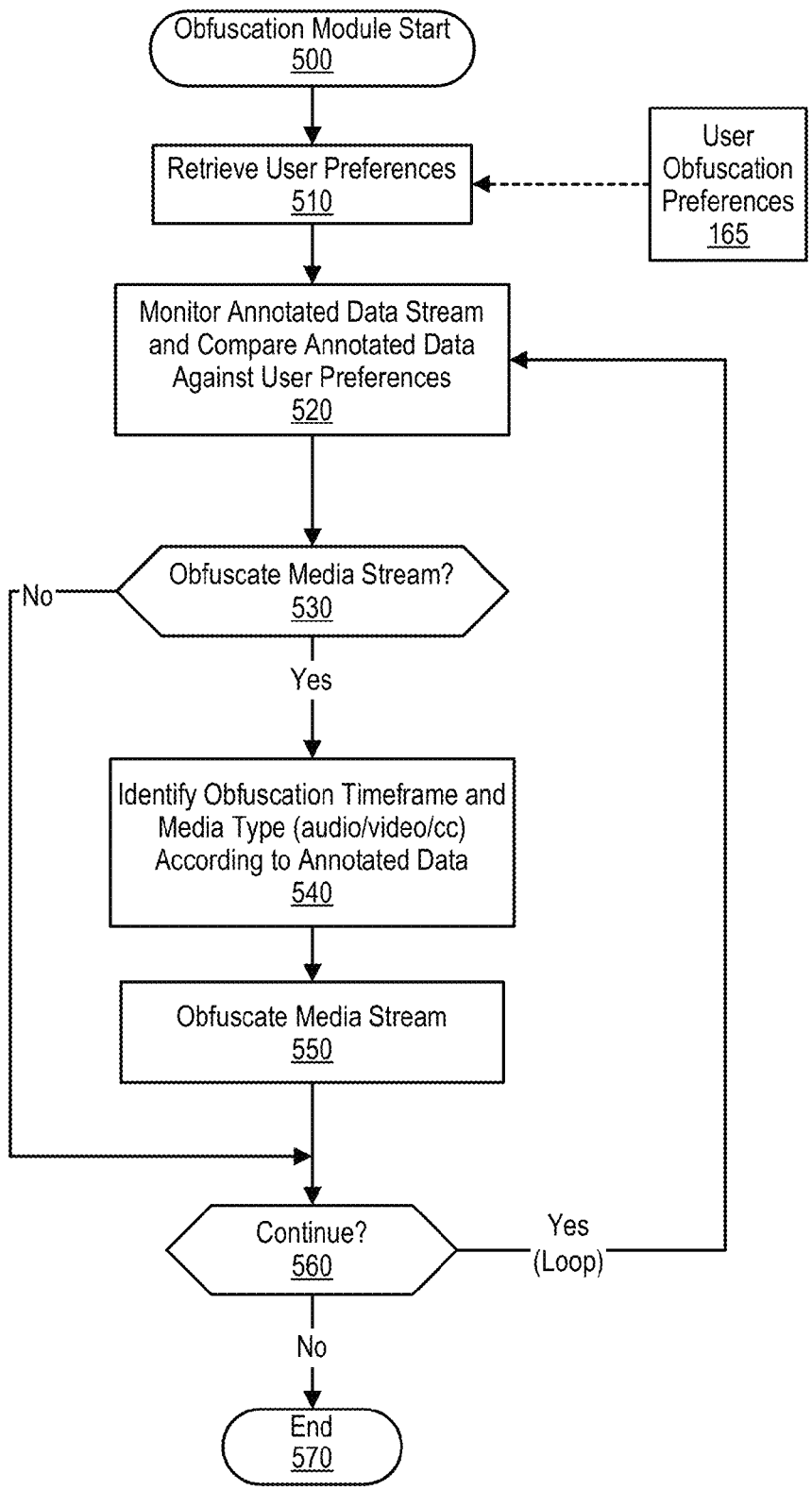
FIG. 5 is a flowchart showing steps taken in an obfuscation module comparing annotated data with user obfuscation preferences and obfuscating a media stream accordingly.

FIG. 5 is a flowchart showing steps taken in an obfuscation module comparing annotated data with user obfuscation preferences and obfuscating a media stream accordingly. Obfuscation module processing commences at 500, whereupon the obfuscation module retrieves user obfuscation preferences 165 at step 510. The user obfuscation preferences may include, for example, high level preferences (Parents watching, Children watching, etc.), mid-level preferences (G, PG, PG-13, etc.) or detail preferences (filter "Violence," etc.). The user obfuscation preferences may also include words and/or phrases that the user wants obfuscated. In one embodiment, the high level preferences and mid-level preferences may correspond to detail preferences that the obfuscation module matches against the annotated data. For example, a "Family" preference may point to detail preferences that obfuscate violence, profanity, etc.

At step 520, the obfuscation module monitors the annotated data stream and compares the annotated data against the user obfuscation preferences. The annotated data stream, in one embodiment, includes annotated textual data and annotated semantic data (see FIG. 1 and corresponding text for further details).

A determination is made as to whether to obfuscate a segment of the media stream based upon the comparison (decision 530). If the obfuscation module should obfuscate a portion of the media stream corresponding to the annotated data, decision 530 branches to the "Yes" branch, whereupon the obfuscation module identifies an obfuscation timestamp and media type for which to obfuscate at step 540. For example, the annotated data stream may include profanity to obfuscate from 2:45-2:48 and, in this example, the obfuscation module may obfuscate the audio content and the closed captioning content from time 2:45-2:48. In another example, the annotated data stream may include violence to obfuscate from 3:40-3:55 and, in this example, the obfuscation module may obfuscate the video and audio content from time 3:40-3:55. At step 550, the obfuscation module obfuscates the media stream accordingly, such as augmenting the closed-captioning stream, playing a bleep through speakers, and/or obfuscating the video signal.

A determination is made as to whether to continue analyzing the annotated data stream (decision 560). If the obfuscation module should continue analyzing the annotated data stream, decision 560 branches to the "Yes" branch, whereupon processing loops back to continue analyzing the annotated data stream. This looping continues until the obfuscation module should terminate, at which point decision 560 branches to the "No" branch, whereupon processing ends at 570.

FIG. 6 is a flowchart showing steps taken in a crowdsourcing module updating public blacklist information according to public opinion. In one embodiment, crowdsourcing subsystem 135 collects large amounts of public information (public input content) and aggregates the information to gain a complete and accurate picture of a topic (e.g., which words/phrases the public deems as blacklisted). In turn, crowdsourcing subsystem 135 provides public blacklist updates to filter subsystem 100 as required.

Crowdsourcing processing commences at 600, whereupon processing receives public input content from users, such as words and/or phrases that users consider inappropriate and/or offensive (step 605). At step 610, processing checks distributed blacklist store 615 to determine if the received word/phrase is already included in a public blacklist table. A determination is made as to whether the word/phrase was included in the public blacklist table (decision 620). If the word/phrase is already distributed, decision 620 branches to the "Yes" branch.

On the other hand, if the word/phrase is not currently included in the public blacklist table, decision 620 branches to the "No" branch, whereupon processing checks reliable online sources to gather information as to whether the word/phrase could be considered as a blacklist candidate (decision 630). For example, processing may access a reliable public dictionary to identify the context in which the word/phrase is utilized. If the online sources indicate that the word/phrase is a candidate, decision 630 branches to the "Yes" branch, whereupon the word/phrase is added to the public blacklist table at step 665.

On the other hand, if the online source does not indicate that the word/phrase is a blacklist candidate, decision 630 branches to the "No" branch, whereupon processing checks blacklist monitoring store 640 for the received public input, which tracks the number of blacklist request occurrences the crowdsourcing module receives for particular words/phrases (step 635). A determination is made as to whether the word/phrase has already been logged (decision 645). If the word/phrase has not been logged, decision 645 branches to the "No" branch, whereupon processing adds the word/phrase to the blacklist monitoring list at step 650, and increments the monitor count for the word/phrase at step 655. On the other hand, if the word/phrase has already been included in the monitor list, decision 645 branches to the "Yes" branch, bypassing step 650 and incrementing the monitor count for the word/phrase at step 655.

A determination is made as to whether the monitor count reaches a blacklist threshold (decision 660). For example, the blacklist threshold may be set at 20, thus indicating that a particular word/phrase should be entered by 20 users (e.g., different users) before being added to the blacklist. If the monitor count reaches the blacklist threshold, decision 660 branches to the "Yes" branch, whereupon processing adds the word/phrase to the public blacklist (included in distributed blacklist store 415) and distributes an updated public blacklist to filter subsystem 100 (step 670). In one embodiment, the blacklist threshold may also include a time-based component. In this embodiment, a word/phrase may be required to be received a number of times over a certain time period (e.g., 20 times within a one month). On the other hand, if the monitor count did not reach the threshold, decision 660 branches to the "No" branch, bypassing step 670.

A determination is made as to whether to continue to receive public input (decision 680). If processing should continue, decision 680 branches to the "Yes" branch, which loops back to receive and process more words/phrases from the public. This looping continues until processing should terminate, at which point decision 680 branches to the "No" branch whereupon processing ends at 690.

Figure 7:
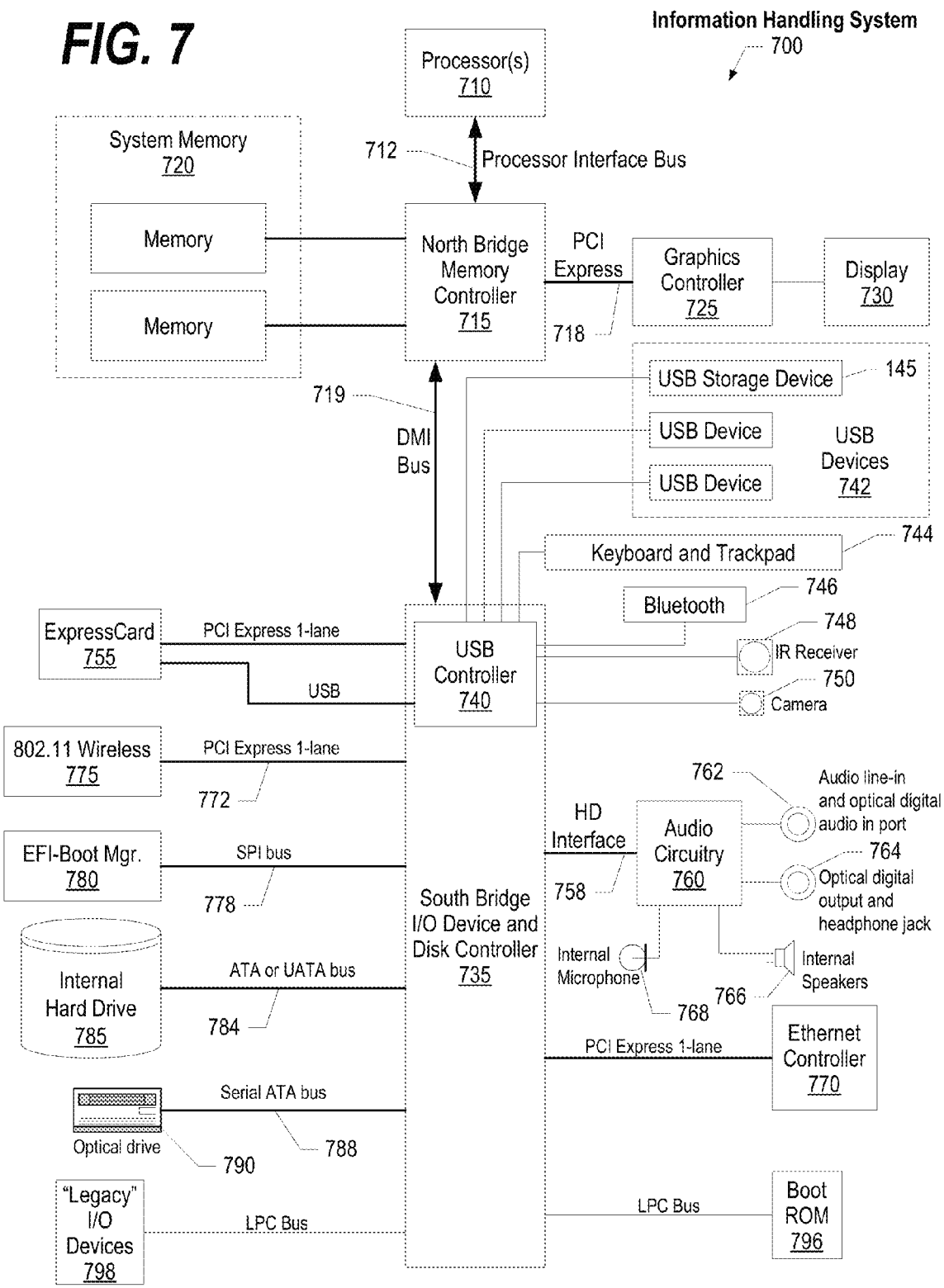
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 8:
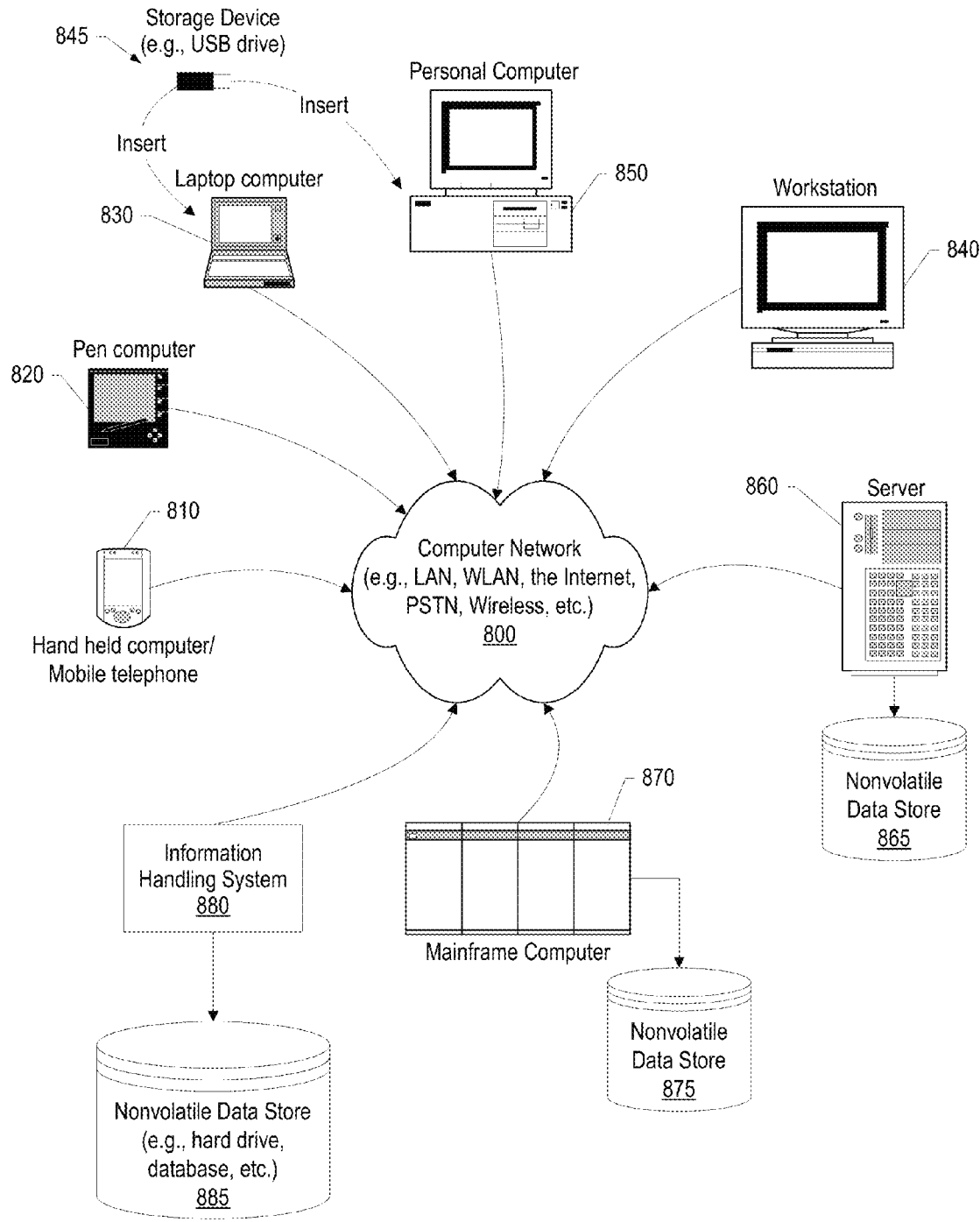
FIG. 8 provides an extension of the information handling system environment shown in FIG. 7 to illustrate that the methods described herein can be performed on a wide variety of information handling systems which operate in a networked environment.

FIG. 8 provides an extension of the information handling system environment shown in FIG. 6 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 645 can be shared among two or more information handling systems using various techniques, such as connecting the removable nonvolatile storage device 645 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   receiving a media stream at a content receiver provided by a content provider;
   selecting, by the content receiver, a media stream segment included in the media stream that includes media content, wherein the media stream segment includes an audio stream;
   converting the audio stream to textual content;
   matching the textual content to one or more blacklist table entries;
   assigning a textual category and a textual category level corresponding to the one or more matched blacklist table entries to the textual content;
   identifying, by a natural language processor, a semantic meaning of the textual content;
   selecting a semantic category that corresponds to the identified semantic meaning;
   generating annotation data that includes the matched textual content, the textual category, the category level, the semantic category, and a timestamp corresponding to the textual content;
   comparing, by one or more of the processors, the annotation data with one or more obfuscation preferences corresponding to prohibited content; and
   modifying, by one or more of the processors, the media stream segment in response to the comparison, wherein the modifying obfuscates the portion of the media content.

2. The method of claim 1 wherein the media stream includes a video stream that includes closed captioning information, the method further comprising:
   converting the closed captioning information to closed captioning text; and
   including the closed captioning text in the textual content.

3. The method of claim 1 wherein:
   the content receiver includes a filter subsystem that generates the annotated data.

4. The method of claim 1 wherein the content provider includes a filter subsystem that assigns the textual category, and wherein the content provider provides the media stream and the textual category to the content receiver.

5. An information handling system comprising:
   one or more processors;
   a memory coupled to at least one of the processors;
   a set of computer program instructions stored in the memory and executed by at least one of the processors in order to perform actions of:
   receiving a media stream provided by a content provider at the information handling system, wherein the information handling system is a content receiver;
   selecting a media stream segment included in the media stream that includes media content, wherein the media stream segment includes an audio stream;
   converting the audio stream to textual content;
   matching the textual content to one or more blacklist table entries;
   assigning a textual category and a textual category level corresponding to the one or more matched blacklist table entries;
   identifying a semantic meaning of the textual content;
   selecting a semantic category that corresponds to the identified semantic meaning;
   generating annotation data that includes the matched textual content, the textual category, the category level, the semantic category, and a timestamp corresponding to the textual content;
   comparing the annotation data with one or more obfuscation preferences corresponding to prohibited content; and
   modifying the media stream segment in response to the comparison, wherein the modifying obfuscates the portion of the media content.

6. The information handling system of claim 5 wherein the media stream includes a video stream that includes closed captioning information, and wherein, when executed by one or more of the processors, the set of computer program instructions performs additional actions of:
   converting the closed captioning information to closed captioning text; and
   including the closed captioning text in the textual content.

7. The information handling system of claim 5 wherein the content provider is different than the information handling system.

8. The information handling system of claim 5 wherein the content provider includes a filter subsystem that assigns the textual category, and wherein the content provider provides the media stream and the textual category to the content receiver.

9. A computer program product stored in a non-transitory computer readable storage medium, comprising computer program code that, when executed by an information handling system, causes the information handling system to perform actions comprising:
   receiving a media stream provided by a content provider at the information handling system, wherein the information handling system is a content receiver;
   selecting a media stream segment included in a media stream that includes media content, wherein the media stream segment includes an audio stream;
   converting the audio stream to textual content;
   matching the textual content to one or more blacklist table entries;
   assigning a textual category and a textual category level corresponding to the one or more matched blacklist table entries;
   identifying a semantic meaning of the textual content;
   selecting a semantic category that corresponds to the identified semantic meaning;

generating annotation data that includes the matched textual content, the textual category, the category level, the semantic category, and a timestamp corresponding to the textual content;

comparing the annotation data with one or more obfuscation preferences corresponding to prohibited content; and modifying the media stream segment in response to the comparison, wherein the modifying obfuscates the portion of the media content.

10. The computer program product of claim 9 wherein the media stream includes a video stream that includes closed captioning information, and wherein the information handling system performs additional actions comprising:

converting the closed captioning information to closed captioning text; and including the closed captioning text in the textual content.

11. The computer program product of claim 9 wherein the content provider is different than the information handling system.

* * * * *